United States Patent [19]

Rice et al.

[11] Patent Number: 5,034,593
[45] Date of Patent: Jul. 23, 1991

[54] COATED WELDING CUPS

[75] Inventors: Roy W. Rice, Alexandria, Va.; Philip L. Berneburg, Potomac, Md.

[73] Assignee: W. R. Grace & Co.-Conn., New York, N.Y.

[21] Appl. No.: 498,294

[22] Filed: Mar. 23, 1990

[51] Int. Cl.⁵ .............................................. B23K 9/32
[52] U.S. Cl. ................................ 219/137.43; 219/136
[58] Field of Search ....................... 219/137.43, 136, 75

[56] References Cited

U.S. PATENT DOCUMENTS

| | | |
|---|---|---|
| 2,827,550 | 8/1955 | Unrath . |
| 3,237,648 | 10/1963 | Syrigos . |
| 3,430,837 | 3/1969 | Hein . |
| 3,536,888 | 10/1970 | Borneman . |
| 3,697,721 | 10/1972 | Robba et al. ........................ 219/136 |
| 4,575,612 | 3/1986 | Prunier . |
| 4,672,163 | 6/1987 | Matsui et al. . |

FOREIGN PATENT DOCUMENTS 497109 7/1976 U.S.S.R. .......................... 219/137.43

Primary Examiner—Clifford C. Shaw
Attorney, Agent, or Firm—Steven Capella; Edward J. Cabic

[57] ABSTRACT

An improved welding cup is made from graphite or ceramic fiber composites, coated with silicon nitride, sialon, boron nitride, or silicon carbide. The cup shows superior resistance to erosion, slagging, and thermal fracture.

17 Claims, 2 Drawing Sheets

COATED WELDING CUPS

FIELD OF THE INVENTION

The invention relates to welding cups, especially as used in metal inert gas (MIG) welding.

BACKGROUND OF THE INVENTION

There exists a variety of methods of welding or cutting materials, especially metals, where the process for practical reasons is desired to be carried out in air, yet the hot (particularly the molten) metal is desired to be protected from the air, and/or from contamination (e.g. dust). Such systems commonly use arc or other plasma heating. The requirement for protecting hot metal (or electrodes) from the air while operating in air is accomplished by the use of an approximately cylindrically shaped nozzle or cup that fits over the heat source (e.g. contact tubes or electrodes) such that an inert gas can be passed through the nozzle and over the electrodes and the hot metal to protect them from the air. Such cups or nozzles are mainly or exclusively metal or ceramic; the latter being extensively used for TIG (tungsten inert gas) welding since the amount of heating and especially metal spattering onto the nozzle is limited.

Ceramics have been tried for MIG welding in an attempt to reduce spatter buildup on the nozzle (a more severe problem with MIG welding than TIG welding) and hence thereby minimize diversion or blockage of gas flow. Ceramic nozzles have also been used because they are electrical insulators and are lighter weight than corresponding metal nozzles. Nevertheless, ceramic nozzles have been generally unsuccessful for MIG welding because of greater spatter problems or mechanical failure (due to thermal stresses or mechanical impact) or both. Further, some monolithic ceramics, e.g. silicon nitride ($Si_3N_4$), that have shown a degree of technical success, have proved far too expensive (e.g. by 5-10 fold).

This invention addresses both the performance and cost issues by combining a set of technologies to give a family of nozzles to meet a range of cost and performance criteria.

The patent literature is replete with attempts (largely unsuccessful) to solve MIG welding cup problems of slagging (slag or spatter buildup), fracture, and erosion. The following U.S. patents may be mentioned.

U.S. Pat. No. 2,827,550 discloses a cup (uncoated) made of a thermoset resin reinforced with paper, glass fiber, or asbestos.

In U.S. Pat. No. 3,237,648 the contact tube (composition unstated) is coated with silicon nitride. The cup (composition unstated) is not coated.

U.S. Pat. No. 3,430,837 discloses a ceramic cup and center tube coated with Teflon or pyrolytic graphite.

U.S. Pat. No. 3,536,888 discloses a cup formed of porcelain, alumina, beryllia, zirconium silicate, zirconia, magnesium aluminum silicate, cordierite, mullite, ceramic graphite, or boron nitride. The cup is coated with a silicate or silicone.

In U.S. Pat. No. 4,575,612 the cup comprises a refractory steel sheath coated with chromium oxide, alumina, or "ceramic". The contact tube may comprise braided glass fiber coated with silicone.

U.S. Pat. No. 4,672,163 discloses an uncoated cup formed of silicon nitride or sialon.

OBJECTS OF THE INVENTION

An object of the invention is to provide a welding torch tip or cup with superior resistance to thermal shock cracking, slag wetting, and erosion for severe gas welding environments such as metal inert gas welding (MIG), especially for robotic or automatic operations.

Another object is to provide superior substitutes for standard copper or brass MIG cups.

A further object of the invention is to prepare a composite welding nozzle from a ceramic fiber or fabric base or form.

Another object is to prepare a ceramic coated welding cup, wherein the cup is carbon-based.

Another object is to provide cups or nozzles for other related operations, e.g. plasma or arc cutting.

These and further objects will become apparent as the description of the invention proceeds.

SUMMARY OF THE INVENTION

Novel welding cups (or welding nozzles) are prepared by a new process, wherein a cup base or preform is made of bulk carbon (preferably in the graphite form) or a composite containing graphite fibers or other ceramic fibers and a matrix of carbon or other ceramic material, e.g. of a carbon matrix and oxide or carbon fibers in braided or other forms, said preform being coated with a compatible ceramic that is resistant to metal spatter, e.g. silicon nitride, sialon (which is silicon aluminum oxynitride), boron nitride, or silicon carbide. The resulting cup gives superior performance in metal inert gas (MIG) welding, particularly with respect to erosion, slag adherence, and thermal fracture. Coatings are suitably applied by chemical vapor deposition (CVD). A preferred cup (based on cost and thermal properties) is a carbon (graphite) preform coated with silicon nitride where mechanical impact and other mechanical stresses are not particularly severe. Where they are severe, fiber composites are the preferred preform.

DETAILED DESCRIPTION OF THE INVENTION

The basis of the invention is a composite nozzle based on the combination of a monolithic carbon body or largely carbon containing composite body with a ceramic coating (e.g. silicon nitride) to minimize spatter adherence/build-up and to provide good thermal shock resistance and oxidation resistance. The cup base or body itself may be either simply a monolith preform of graphite (e.g. consisting of graphite, carbon, or both), or a composite with dispersed particles, chopped fiber, or a continuous fiber singly or in combination in a matrix of carbon or other ceramic material. This order of dispersed form of reinforcement reflects emphasis shifting from limited impact and other mechanical needs with highest thermal conductivity to the highest level of mechanical integrity with less thermal conductivity. The fibers can be either graphite fibers or other ceramic fibers and the matrix material used with the fibers can be either carbon (graphite) or a ceramic type material.

The carbon/graphite containing cup with its excellent thermal conductivity conducts heat away from the hot end adjacent the welding zone much better than ceramic cups. The ceramic coating sheds the slag produced in the welding zone. By using the combination of the carbon cup or carbon containing composite cup with the specified coatings there is a good matching of the thermal expansion of the materials such that the coatings do not flake or fall off upon repeated heatings.

The continuous fibers may be in various forms, but filament wound, or braided fiber sleeving or tubes are particularly appropriate. Sleeving diameter can vary over a wide range. A preferred sleeving is formed of braided strands of ceramic fibers. Braided ceramic sleeving is commercially available from several sources. Sleevings can be fabricated from various fibrous materials such as aluminum borosilicate, silica, silicon carbide, and carbon/graphite fibers. In a preferred embodiment, braided sleeving may be made using strands of fibers 5 to 20 microns in diameter.

Matrices for the composites could be the same or similar materials as for the coatings. However, carbon is preferred for thermal, weight, and especially cost issues. Further, while matrices might be developed by conventional powder or chemical (e.g. chemical vapor deposition) methods, use of polymers pyrolyzed to carbon in-situ is preferred. For example, use of low cost, e.g. melt spun, silicate fibers is made feasible by the use of polymer-derived carbon (e.g. glassy carbon) matrices, due to low processing temperatures.

Coatings of $Si_3N_4$, sialon, SiC, boron nitride or mixtures thereof are selected both for thermal expansion compatibility with the cup base, good spatter resistance, and economical application via chemical vapor deposition (CVD). A finished cup can also be made by chemical vapor infiltration with a carbon based precursor into a fiber preform, followed by CVD coating with silicon nitride or other protective material.

Figure 1:
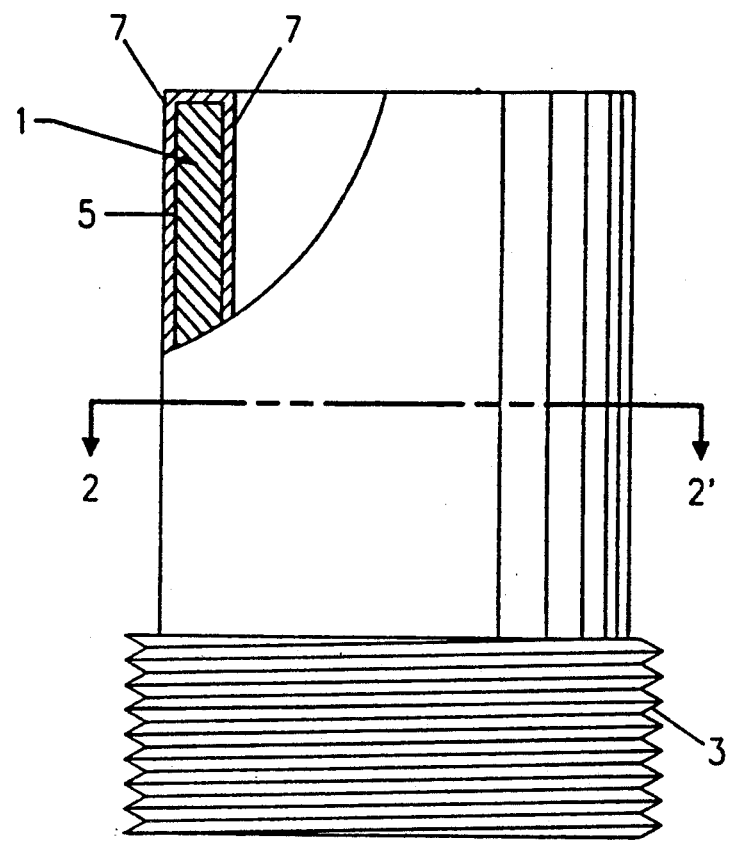
FIG. 1 is a perspective view in elevation with parts cut away, of an embodiment of the welding cup of the invention.
Figure 2:
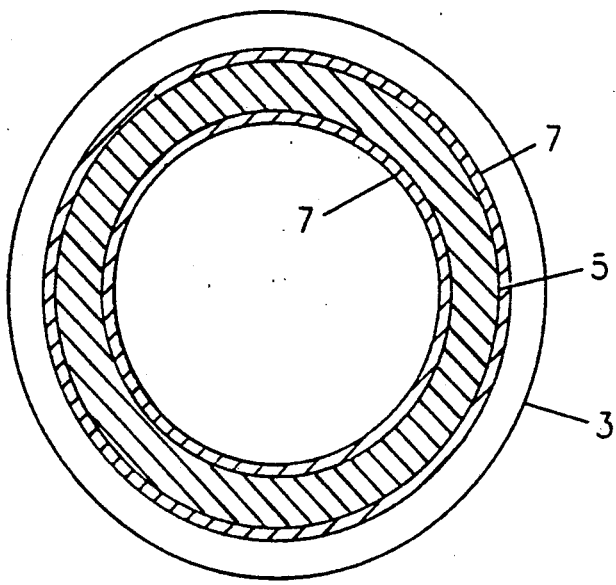
FIG. 2 is a view of the section taken along the line 2—2' of FIG. 1.

FIG. 1 shows generally the welding cup base formed of graphite or of ceramic weave or braid. On this base 1 is a threaded terminus 3, integrally formed as part of the base or added to the base, for ready attachment to a welding torch (not shown). The walls 5 of the cup 1 are coated with a thin layer 7 of silicon nitride, silicon carbide, sialon or boron nitride. The Figures show wall coatings both inside and out. Actually, coating only on the inside and on, and near the end is required. However, as normally applied (e.g., by chemical vapor deposition), all surfaces are covered. The coating is not shown to scale. In the work described herein, it was typically quite thin, of the order of about 0.003"–0.025" thick.

Figure 3:
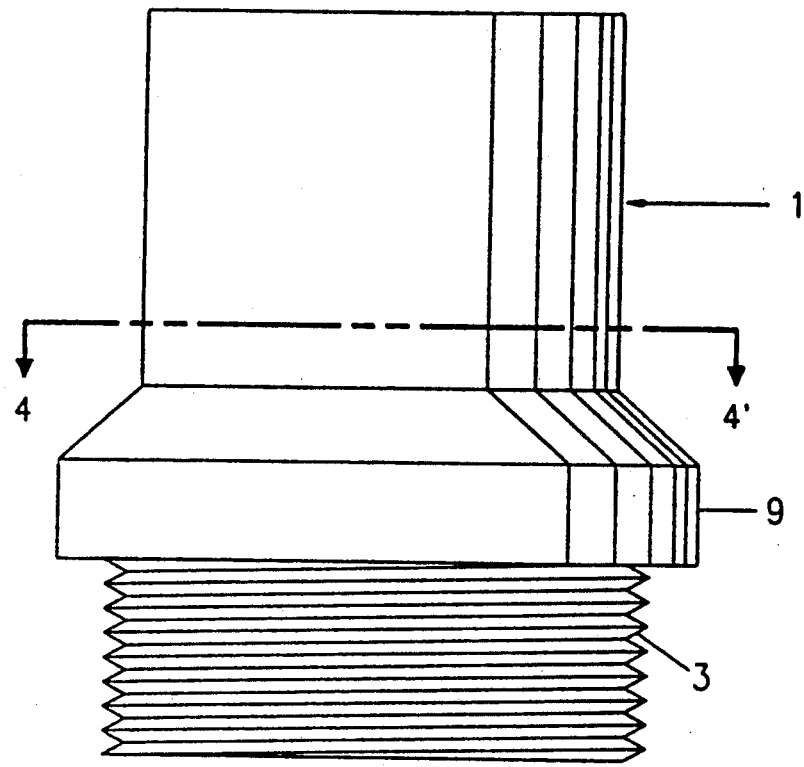
FIG. 3 is a perspective elevation view of another embodiment of the invention welding cup.
Figure 4:
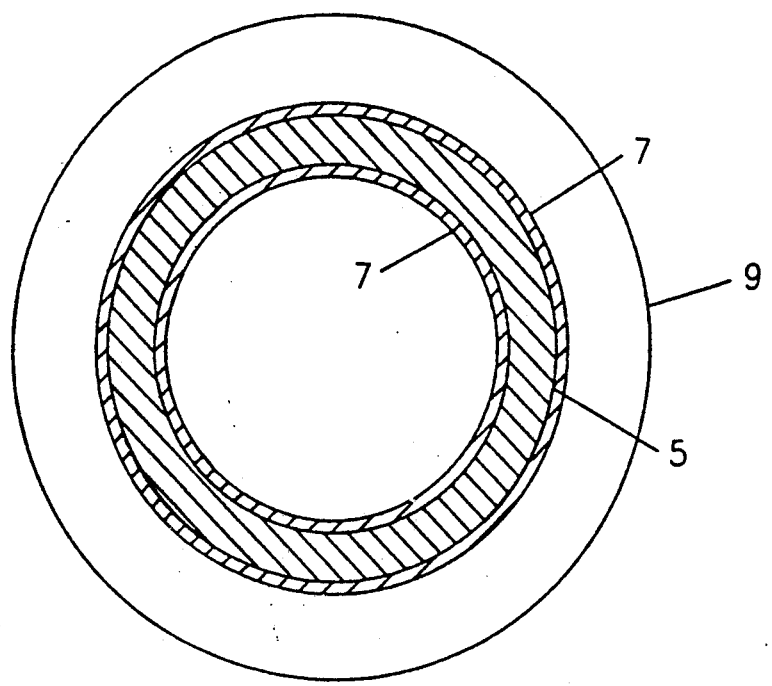
FIG. 4 is a view of the section taken along the line 4—4' of FIG. 3.

FIGS. 3 and 4 show an optional embodiment wherein a handling flange 9 is molded or otherwise formed as part of the base or preform 1.

As used herein, "welding cup" means the same as "welding nozzle".

"Center tube" refers to the electrode-bearing tube in the axis of a MIG cup of an electric welding torch.

"Matrix" means the material in a fiber composite cup base or preform which bonds the fibers together and rigidizes the structure, and partially or completely fills the spaces between the fibers. For example, an organic material or ceramic precursor may be used to infiltrate or impregnate a fibrous base or preform (e.g., braided ceramic fibers), thereby providing a prepyrolysis matrix, which can be pyrolyzed in-situ to provide a rigid, mechanically strong and thermally stable matrix.

"Woven or interwoven fibers or fabric" includes "braided or filament wound fibers". If the weave or fabric is not stated, braided fibers are meant.

"Preform" or "cup preform" refers (a) in the case of a ceramic fabric base, to the base or form before infiltration of a carbon or ceramic precursor or inorganic slip or sol; or (b), when the context requires, to the matrix-containing base before coating with silicon nitride or the like; or (c) in the case of a graphite monolith, simply to the base monolith before silicon nitride or other coating is applied. Unless otherwise inconsistent with context, cup preform generally means the same as "cup base".

A preferred method of coating uses chemical vapor deposition. CVD is a well-known process for depositing coatings such as silicon carbide and/or silicon nitride on suitable heat-resistant substrates. In using CVD, the preform cup would, for example, be positioned in a heated (e.g. 1000° C.) chamber. Silicon tetrachloride and methane for example enter the chamber and partially dissociate and react in contact with the heated surfaces, thereby depositing a coating of silicon carbide on the cup. If ammonia is substituted for methane, silicon nitride is deposited. A mixture of methane and ammonia with silicon tetrachloride will deposit a mixture of silicon carbide and silicon nitride. Such external coatings are dense, extremely hard, and impart prolonged wear resistance to the cup. Other coating methods include pack coating (e.g. Si for reaction with carbon in the preform), or coating with a liquid organometallic or pre-ceramic polymer followed by pyrolysis.

The finished composite cup is highly resistant to wear, impact stress, heat, and the welding environment. It is light and dimensionally stable at use temperatures. For embodiments using carbon/graphite for both the fibers and matrix, the resulting finished cup is especially light.

The composite cups having an appropriate coating can be made by a variety of processes readily available to those skilled in the art, based on the performance/cost needs of the resultant nozzle. Thus, the simplest manifestation for limited mechanical (e.g. impact) demands would be a typical machined, or more preferably molded, graphite body, with the density, graphite content and character (e.g. particle size) being determined by the combination of performance-cost-process needs. Thus, for example, isopressing, injection molding, and compression molding are efficient forming routes and are well known. For applications somewhat more demanding in mechanical performance beyond that achievable with simple graphite based composites, chopped fiber composites are recommended. Whiskers are also useful when available at acceptable costs. Again, similar molding techniques can be utilized. However, for higher fiber loadings for more demanding applications, fiber preforms can be made, e.g. by vacuum forming, then infiltrated by liquid matrix precursors, or by vapors for chemical vapor matrix deposition as discussed below for continuous fiber composites.

Continuous fiber composites as used in the invention typically employ fiber bundles (or tows) interweaved at significant angles to the nozzle axis, e.g. as in a braided or filament wound tube. Filament winding of the fiber tows can be incorporated with addition of the matrix precursor. However, we prefer to make a fiber preform, e.g. from braided tubing, then to infiltrate this with a liquid matrix precursor, which commonly produces a ceramic when properly pyrolyzed. Such pyrolysis is advantageous because of the modest temperatures (e.g. 1000° C.) required, thereby substantially broadening the selection of fibers that can be used since processing rather than use conditions often are fiber limiting. Other liquid precursors, e.g. slips or sols, can also be used as infiltrants. Additionally, chemical vapor infiltration can also be used to generate the matrix (i.e., the impregnating material) by infiltration of vapors. While various fibers, e.g. carbon/graphite, SiC, etc. can be used, oxide, especially melt spun oxide fibers are favored for low costs and better oxidation-corrosion resistance (e.g. in case of cracking of the protective coating). Though other ceramics can be used, carbon is preferred as the matrix because of higher thermal conductivity and especially lower cost, as well as overall chemical and mechanical (e.g. thermal expansion) compatibility with the rest of the system. Where cracking of the coating in severe oxidation-corrosion environments may cause problems for the carbon matrix, admixture of ceramic constituents such as SiC, $Si_3N_4$, and especially $SiO_2$, $Al_2O_3 + SiO_2$ (mullite), or other silicates, borates, or borosilicates introduced as particulates or sols, polymers or other liquids, with the carbon producing polymer before pyrolysis is recommended. It is recognized that more than one impregnation-pyrolysis cycle may be needed with polymer precursors, though use of particulate fillers as noted above can reduce the need for additional infiltration.

In treating a preform with a slip or sol, the preform can be immersed in a sol or other colloidal suspension of heat-bondable ceramic particles, such as colloidal suspensions of silica and/or alumina. The heat-bondable ceramic used should be chemically and mechanically compatible with the fibers and should bond at a relatively low temperature (i.e. less than about 1000° C.). The ceramic-infiltrated cup preform is then heat treated to bond the heat-bondable ceramic particles and rigidize the preform. The ceramic-impregnated structure formed by such heating is a rigidized preform cup. The voids present prior to ceramic impregnation are partially filled during rigidization with heat-bondable ceramic which has been bonded.

If it is desired to densify the preform by further filling the voids with carbon or other ceramic material, the rigidized preform may be impregnated with an additional matrix precursor material. Finished cups may thus be fabricated from such preform cups by further processing which includes impregnating said rigidized preform cups with a carbon precursor resin (or another ceramic matrix precursor or mixtures thereof optionally along with particulate ceramic fillers) and pyrolyzing the precursor in-situ to yield a ceramic fiber reinforced composite. More than one impregnation-pyrolysis cycle may be used to obtain the desired matrix character. This is followed by coating said ceramic fiber reinforced composite preform with silicon nitride, boron nitride, or silicon carbide, or a mixture thereof using, e.g., chemical vapor deposition (CVD). Coating application may follow, or overlap with, matrix development.

Accordingly, the matrix may be provided at least in part by pyrolyzing matrix precursors. Matrix precursors, regardless of the fabrication technique, are typically a colloidal suspension or sol, or a preceramic polymer which is converted to a rigid ceramic matrix by heating to a sufficient temperature in a controlled atmosphere. Preceramic polymers that pyrolyze upon heating to form a matrix of carbon, silicon nitride, silicon carbide, silica or a mixture thereof are of particular interest.

A variety of carbon precursor resins is available for this use (e.g. furan resins and phenol resins). Carbon precursor resins are generally low cost, low density materials which are suitable for many applications. Besides carbon precursors, other ceramic precursors are available, e.g., polysilanes, polycarbosilanes or polysilazanes. All these may be used to provide a ceramic matrix. When a precursor material is used, it is pyrolyzed in-situ to yield a rigidized and densified ceramic composite cup preform. Pyrolysis for carbon, carbide, or nitride matrix formation should be performed under non-oxidizing conditions (e.g. in a nitrogen atmosphere). This process of precursor impregnation and pyrolysis may be repeated several times to produce a highly densified composite.

In some embodiments of the invention it is advantageous to include filler particles along with some matrix precursors, especially preceramic polymers. Such fillers should be selected to be compatible with both the processing conditions (e.g. infiltration and pyrolysis temperature) and performance characteristics desired (e.g. thermal expansion, hardness, wear, and oxidation resistance) of the resultant composite.

The cup-coating material should be resistant to both adherence and attack by spatter of molten metal or slag, and resistant to thermal shock. Mechanical integrity of the coating requires a reasonable thermal expansion match between the coating and the substrate composite, typically having a moderate to low expansion. Coatings found useful in this invention include boron nitride, SiC, sialon, and especially $Si_3N_4$. Such coatings can readily be applied by chemical vapor deposition. However, application by liquid coating with a preceramic polymer followed by pyrolysis can also be used. Similarly methods such as sol coating and firing, or particulate (e.g. frit) coating following glass-enamel coating procedures can be followed provided degradation of the fibers is avoided.

Various steps of the piece work approach to preparing the preforms and finished cups of the current invention as illustrated above can be feasibly combined in accordance with conventional processing technology, including injection molding, compression molding, (e.g., for threads and flanges), extrusion, and pultrusion.

The following examples illustrate without limiting the invention.

EXAMPLE 1

Bulk Graphite Coated with Silicon Nitride

A number of welding cups were fabricated based on machined bulk graphite tubular preforms, ½″ long, 1″ O.D., wall thickness ⅛″. The preforms were machined having a larger diameter flange for handling similar to the form illustrated in FIG. 3 and 4 and were threaded at one end for insertion in a welding torch. The machined preforms were subsequently coated with silicon nitride in a conventional CVD process.

Actual MIG welding tests conducted using the invention cups showed superior performance with respect to erosion, slagging, and thermal cracking compared to uncoated monolithic ceramic cups. No end recession or erosion was observed; accumulated slag was only lightly adherent and easily removed, and no fracturing was observed.

These observations were made during three different welding tests performed using the subject cups. In the first test, MIG welding was performed at a commercial welding shop. A Tweco Products Co. "Supra 6" 600 amp gun with nozzle insulator was used with the subject cups substituted for the standard copper nozzles. Welding on steel plates was performed at 240A, 50V DC with pure $CO_2$ cover gas and at 450-500A 40V DC. In both cases, the accumulated slag on the ends of the cup was easily removed and no degradation of the $Si_3N_4$ surface coating was observed.

In a second test of the same type of welding cups as above, welding was performed in a similar manner except that 450-500A 32V DC was used with a different cover gas, 75% Ar 25% $CO_2$, welding continuously for approximately one minute. The accumulated slag on the end of the cup flaked off cleanly and easily.

EXAMPLE 2

Two experimental cups of the same type as in Example 1 were tested for welding performance in comparison with the standard commercially available copper nozzles as well as monolithic reaction-bonded silicon nitride (RBSN) and sialon cups. Testing was performed at the Edison Welding Institute, Columbus, Ohio using $CO_2$ shielded flux cored arc welding, which produces a harsh welding environment and therefore a rigorous test. Continuous welds were made on a rotating 11" diameter mild steel pipe by traversing the torch along the axis of the pipe. A 600 amp air-cooled Tweco "Supra 6" MIG gun was used with 3/32" electrode wire at 450A, 32V under $CO_2$ shielding gas. Nozzles were examined after 30 minutes and 3 hours (with intermittent cleaning), respectively, of continuous welding.

The testing revealed that the copper nozzles became increasingly difficult to clean (remove accumulated slag) with increased welding time. All of the ceramic nozzles were easier to clean than the copper nozzles. However, the RBSN and sialon nozzles also exhibited extensive erosion at the end. The silicon nitride coated graphite nozzles (the invention) did not get as hot as the other ceramic nozzles, were the easiest to clean, and showed little or no evidence of wear.

EXAMPLE 3

Braided Ceramic Fiber Coated with Silicon Nitride

The cup in this example was based on a flexible braided ceramic fiber sleeve preform. The fiber was aluminum borosilicate. The braids were strands of a plurality of very fine fibers, typically about 10-12 microns thick ("Nextel", from 3M Corporation). The sleeve was about 1.5" long, about ⅞" O.D., with walls about 3/32" thick. The braided fiber sleeving was shaped into a cylinder and rigidized by impregnation with colloidal $Al_2O_3$ followed by drying and high-temperature firing at 500°-800° C. The rigidized form was then impregnated with a furan resin, cured, and then pyrolyzed at 1000° C. to yield a fiber reinforced carbon matrix composite cup. The form was then coated inside and out with silicon nitride by conventional chemical vapor deposition.

The cup was used in a modified welding test in which it was placed over a steel rod mounted on a steel plate, and MIG welding at 50V 140A was performed on the enclosed steel part for several seconds to determine thermal shock resistance of the cup. The cup survived intact, whereas other coated and uncoated non-composite experimental cups tested at the same time composed of a monolithic mullite ceramic (which is normally considered to be thermally shock resistant), shattered.

It is understood that the foregoing detailed description is given merely by way of illustration and that many variations may be made therein without departing from the spirit of this invention. It is further understood that the invention is not confined to the particular formulations and examples herein illustrated, but embraces such modified forms thereof as come within the scope of the following claims.

What is claimed:

1. Welding cup comprising
   (a) a preformed cup consisting essentially of a material selected from the group consisting of:
      (i) carbon,
      (ii) a composite of graphite fibers in a carbon matrix,
      (iii) a composite of ceramic fibers in a carbon matrix,
      (iv) a composite of graphite fibers in a ceramic matrix, and
      (v) a composite of ceramic fibers in a ceramic matrix;
   and
   (b) a coating on said preformed cup selected from the group consisting of silicon nitride, sialon, silicon carbide, boron nitride and mixtures thereof.

2. Welding cup according to claim 1, wherein the preformed cup consists essentially of graphite.

3. Welding cup according to claim 2, wherein the coating is silicon nitride.

4. Welding cup according to claim 1, wherein the preformed cup consists essentially of a composite containing a braided ceramic fiber sleeve in a matrix of carbon.

5. Welding cup according to claim 4, wherein the braided sleeve consists of aluminum borosilicate fiber.

6. Welding cup according to claim 4, wherein the coating is silicon nitride.

7. Welding cup according to claim 1, wherein the preformed cup consists essentially of a composite containing graphite fibers in a carbon matrix.

8. Welding cup according to claim 1, wherein the preformed cup consists essentially of a composite containing ceramic fibers in a carbon matrix.

9. Method of making a welding cup comprising
   (a) shaping a cup preform from a material selected from the group consisting of:
      (i) carbon,
      (ii) a composite of graphite fibers in a carbon matrix,
      (iii) a composite of ceramic fibers in a carbon matrix,
      (iv) a composite of graphite fibers in a ceramic matrix, and
      (v) a composite of ceramic fibers in a ceramic matrix;
   and
   (b) coating the cup preform with a material selected from the group consisting of silicon nitride, sialon, silicon carbide, boron nitride and mixtures thereof.

10. Method according to claim 9, wherein the coating is applied by chemical vapor deposition.

11. Method according to claim 10, wherein the coating is silicon nitride.

12. Method according to claim 11, wherein the cup preform is graphite.

13. Method according to claim 11, wherein the cup preform comprises braided ceramic fibers.

14. Method according to claim 13, wherein the ceramic fibers are aluminum borosilicate.

15. In a process of welding using a metal inert gas welding cup, the improvement comprising using a cup comprising
(a) a preformed cup consisting essentially of a material selected from the group consisting of:
 (i) carbon,
 (ii) a composite of graphite fibers in a carbon matrix,
 (iii) a composite of ceramic fibers in a carbon matrix,
 (iv) a composite of graphite fibers in a ceramic matrix, and
 (v) a composite of ceramic fibers in a ceramic matrix;
and
(b) a coating on said preformed cup selected from the group consisting of silicon nitride, sialon, silicon carbide, boron nitride and mixtures thereof.

16. Process according to claim 15, wherein the cup is graphite coated with silicon nitride.

17. Process according to claim 15, wherein the cup consists essentially of a composite comprising braided ceramic fibers in a carbon matrix, said composite being coated with silicon nitride.

* * * * *